United States Patent
Son

(10) Patent No.: US 8,173,310 B2
(45) Date of Patent: May 8, 2012

(54) FUEL CELL SYSTEM AND METHOD FOR OPERATING THE SAME

(75) Inventor: In-Hyuk Son, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 411 days.

(21) Appl. No.: 12/114,999

(22) Filed: May 5, 2008

(65) Prior Publication Data

US 2009/0110977 A1 Apr. 30, 2009

(30) Foreign Application Priority Data

Oct. 30, 2007 (KR) ........................ 10-2007-0109498

(51) Int. Cl.
*H01M 8/06* (2006.01)

(52) U.S. Cl. ........ 429/423; 429/408; 429/416; 429/428; 429/429; 429/433; 429/434

(58) Field of Classification Search ............... None
See application file for complete search history.

(56) References Cited

U.S. PATENT DOCUMENTS

| | | | |
|---|---|---|---|
| 4,965,143 A * | 10/1990 | Mizuno et al. ............ | 429/17 |
| 5,972,137 A | 10/1999 | Wypkema et al. | |
| 7,157,164 B2 | 1/2007 | Nakanishi et al. | |
| 7,833,670 B2 | 11/2010 | Matsuzaki et al. | |
| 2002/0064693 A1 | 5/2002 | Lacy et al. | |
| 2003/0010629 A1 | 1/2003 | St-Pierre et al. | |
| 2004/0001980 A1* | 1/2004 | Balliet et al. ............ | 429/13 |
| 2007/0003805 A1* | 1/2007 | Sugawara et al. ........ | 429/22 |

FOREIGN PATENT DOCUMENTS

| | | |
|---|---|---|
| CN | 1781206 A | 5/2006 |
| EP | 1 521 325 A2 | 4/2005 |
| EP | 1 538 126 A1 | 6/2005 |
| EP | 1 659 652 A1 | 5/2006 |
| EP | 1 892 783 A1 | 2/2008 |
| JP | 02-172159 | 7/1990 |

(Continued)

OTHER PUBLICATIONS

European Search Report for European Patent Application No. 08163919.7 completion date Dec. 3, 2008, mailing date Dec. 11, 2008, indicating relevance of cited references.

(Continued)

*Primary Examiner* — Cynthia Lee

(74) *Attorney, Agent, or Firm* — Christie, Parker & Hale, LLP

(57) ABSTRACT

A fuel cell system and a method for operating the same are disclosed. In one embodiment, a fuel cell system includes a fuel supplier, a reformer for reforming a fuel supplied from the fuel supplier into hydrogen gas by a reforming reaction, and a fuel cell stack for generating electrical energy by an electrochemical reaction between the hydrogen gas and an oxidizing agent. When the fuel cell system is to be stopped, the reforming reaction of the reformer and the electrochemical reaction of the fuel cell are stopped and a portion of unreformed fuel is fed to the reformer and the fuel cell stack. Residual hydrogen is reacted and residual power from the fuel cell stack is dissipated by a power dissipation circuit. By largely removing hydrogen from the fuel cell stack on a stopped condition, reactions that are detrimental to the fuel cell membrane are reduced.

11 Claims, 4 Drawing Sheets

FOREIGN PATENT DOCUMENTS

| | | |
|---|---|---|
| JP | 2003-282114 A | 10/2003 |
| JP | 2003-317770 | 11/2003 |
| JP | 2004-039552 | 2/2004 |
| JP | 2006-236739 | 9/2006 |
| JP | 2006-344408 | 12/2006 |
| JP | 2007-109529 | 4/2007 |
| JP | 2007-200609 A | 8/2007 |
| KR | 10-2004-0009647 | 1/2004 |
| WO | WO 2006/088077 A1 | 8/2006 |

OTHER PUBLICATIONS

KIPO Office action dated Oct. 29, 2009, for priority Korean application 10-2007-0109498, noting listed reference in this IDS.

European communication dated Sep. 23, 2009, for corresponding European application 08163919.7.

KIPO Notice of Allowance dated Jun. 28, 2010, for priority Korean Patent application 10-2007-0109498, noting listed references in this IDS, as well as U.S. Patent 5,972,137, previously filed in an IDS dated Nov. 19, 2009, and U.S. Publication 2007/0003805 cited in the U.S. Office action of Apr. 30, 2010.

SIPO Office action dated Aug. 12, 2010, for corresponding Chinese Patent application 200810144243.7, noting listed references in this IDS, as well as U.S. Patent 4,965,143, previously cited in U.S. Office action dated Apr. 30, 2010.

SIPO Office action, with English translation, for corresponding Chinese Patent Application No. 200810144243.7, dated May 18, 2011, 25 pages.

JPO Office action, for corresponding Japanese Patent Application No. 2008-036214, dated May 17, 2011, 2 pages.

SIPO Office Action dated Sep. 6, 2011, for corresponding Chinese Patent Application No. 200810144243.7, 3 pages.

Japanese Office action dated Sep. 20, 2011, for corresponding Japanese Patent application 2008-036214, noting listed references in this IDS, 2 pages.

Patent Abstracts of Japan, and English machine translation for Japanese Publication 2006-344408, listed above, 35 pages.

Patent Abstracts of Japan, and English machine translation for Japanese Publication 2007-109529, listed above, 42 pages.

Japanese Office action dated Feb. 28, 2012, for corresponding Japanese Patent application 2008-036214, 1 page.

\* cited by examiner

FUEL CELL SYSTEM AND METHOD FOR OPERATING THE SAME

CROSS-REFERENCE TO RELATED APPLICATION

This application claims priority to and the benefit of Korean Patent Application No. 10-2007-0109498 filed in the Korean Intellectual Property Office on Oct. 30, 2007, the entire content of which is incorporated herein by reference.

BACKGROUND OF THE INVENTION

1. Field of the Invention

The present invention relates to a fuel cell system. More particularly, the present invention relates to a fuel cell system and a method for operating the same on shutdown and startup.

2. Description of the Related Art

Fuel cells are used as electricity generating systems for generating electrical energy by an oxidation reaction of a fuel and a reduction reaction of an oxidizing agent. Such fuel cells may be classified into polymer electrolyte membrane fuel cells and direct oxidation membrane fuel cells according to the type of fuel they use.

Polymer electrolyte membrane fuel cells generally have superior output characteristics, lower operating temperatures, and faster starting and response characteristics as compared to direct oxidation membrane fuel cells. Polymer electrolyte membrane fuel cell have been widely used as power sources for vehicles, distributed power sources for houses and public buildings, and compact power sources for electronic devices.

A fuel cell system employing a polymer electrolyte membrane fuel cell generally includes a fuel cell stack, a reformer, a fuel supplier, and an oxidizing agent supplier. The fuel supplier generally includes a fuel tank and a fuel pump, and supplies fuel to the reformer. The reformer generates hydrogen gas from the fuel and supplies the hydrogen gas to the stack. The stack generates electrical energy by an electrochemical reaction between the hydrogen gas from the reformer and an oxidizing agent.

However, in fuel cell systems employing a polymer electrolyte membrane fuel cell according to the prior art, hydrogen peroxide ($H_2O_2$) may be generated from hydrogen gas remaining in the stack after the system is stopped. This can dehydrate the electrolyte membrane of a membrane-electrode assembly (MEA) and deteriorate its performance. This can cause a reduction in the conductivity of the electrolyte. Therefore, system performance cannot recover quickly when the system is restarted.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention provides a fuel cell system and a method for operating the same having advantages in that the system performance can quickly recover when restarted after the system has been stopped. This can be accomplished by filling the stack with unreformed fuel as the system is shut down.

In one embodiment, the invention provides a fuel cell system including a fuel supplier, a reformer, a fuel cell stack, a first valve, and a controller. The reformer reforms a fuel supplied from the fuel supplier into hydrogen gas by a reforming reaction, and the fuel cell stack generates electrical energy by an electrochemical reaction between the hydrogen gas supplied from the reformer and an oxidizing agent. The first valve is disposed between the fuel supplier and the reformer for selectively supplying or blocking fuel to the reformer. The controller is used to open the first valve for a period of time after the reforming reaction of the reformer and the electrochemical reaction of the fuel cell stack are stopped.

The fuel cell system may further include a power dissipation circuit electrically connected to the fuel cell stack to dissipate residual power from the fuel cell stack when the electrochemical reaction of the fuel cell stack is stopped. In an embodiment, the power dissipation circuit is controlled by an external signal.

The reformer may further include a vaporizer that generates steam and a heater for generating heat energy by the combustion of a portion of the fuel in air.

The fuel cell system may further include a fuel recycle conduit disposed between the fuel cell stack and the vaporizer to recycle the fuel from the fuel cell stack to the vaporizer when the fuel cell system is restarted.

Another embodiment of the present invention provides a method for operating the fuel cell system described above. The method includes stopping the reforming reaction of the reformer and the electrochemical reaction of the fuel cell stack based on a stop signal, supplying a portion of the unreformed fuel to the reformer and the fuel cell stack, and dissipating power from the fuel cell stack in order to purge the stack of any unreacted hydrogen.

In order to stop the reforming reaction and the electrochemical reaction, the generation of heat energy used for the reforming reaction may be stopped by interrupting the flow of fuel and/or air to the heater of the reformer.

In an embodiment of the invention, the portion of the unreformed fuel may be supplied to the reformer and the stack when the temperature of the reformer is below a predetermined temperature. This prevents the fuel from reacting in the reformer.

Suitable catalysts for the reformer include ruthenium, alumina, and combinations thereof. According to such an embodiment of the invention, the unreformed fuel may be supplied to the reformer and the stack when the temperature of the reformer has cooled to below 200° C. Suitable fuels include methane, propane, butane, and combinations thereof.

In an embodiment of the invention, any residual hydrogen remaining in the fuel cell stack after the unreformed fuel has been supplied to the stack is reacted and the resulting power is dissipated by a power dissipation circuit. In an embodiment, the power may be dissipated at 0.2 volts when the fuel temperature is 80° C.

After operation of the fuel cell system has stopped, the method for operating the fuel cell system may further include discharging the unreformed fuel in the fuel cell upon a restart signal. According to an embodiment of the invention, the unreformed fuel is discharged from the fuel cell stack and recycled to the reformer, such as to the vaporizer section of the reformer.

In yet another embodiment, the invention provides a fuel cell system including a fuel supplier, a fuel cell stack, a first valve, a bypass valve, and a controller. The reformer reforms a fuel supplied from the fuel supplier into hydrogen gas by a reforming reaction, and the fuel cell stack generates electrical energy by an electrochemical reaction between the hydrogen gas supplied from the reformer and an oxidizing agent. The first valve is disposed between the fuel supplier and the reformer for selectively supplying or blocking the supply of fuel to the reformer, while the bypass valve is disposed on a bypass conduit connecting the fuel supplier to the fuel cell stack. The bypass valve may be used to selectively supply or block flow of fuel to the fuel cell stack. The controller operates the first valve as discussed above, and operates the bypass valve by opening the bypass valve for a period of time after the reforming reaction of the reformer and the electrochemical reaction of the fuel cell stack are stopped.

In another embodiment, the invention provides a method for operating such a fuel cell system. The method includes stopping the reforming reaction of the reformer and the electrochemical reaction of the fuel cell stack based on a stop signal, supplying a portion of the unreformed fuel to the fuel cell stack while preventing the unreformed fuel from flowing into the reformer, and dissipating power from the fuel cell stack.

In the fuel cell system and the method for operating the same according the several embodiments, a portion of the unreformed fuel fills the stack when the system is stopped and any remaining hydrogen is reacted to produce residual power which is dissipated by the power dissipation circuit. Thus, deterioration and dehydration of the electrolyte membrane can be prevented and system performance can be recovered more quickly when the system is restarted.

DETAILED DESCRIPTION OF THE EMBODIMENTS

The present invention will be described more fully with reference to the accompanying drawings in which embodiments of the invention are shown. As those skilled in the art will realize, the described embodiments may be modified in various different ways, all without departing from the spirit or scope of the present invention.

Figure 1:
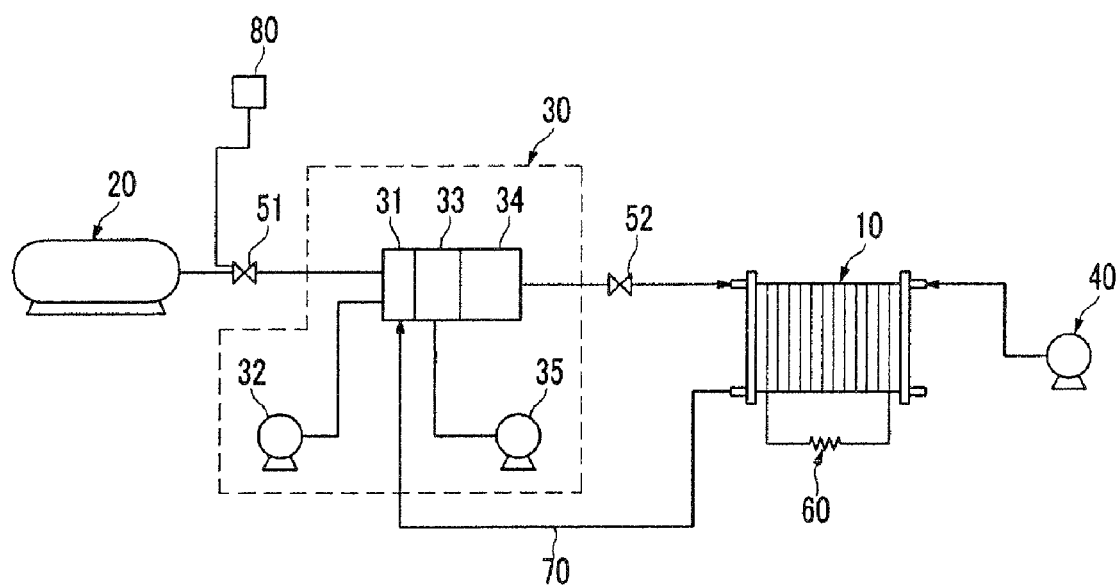
FIG. 1 is a schematic diagram of a fuel cell system according to an embodiment of the present invention.

FIG. 1 is a schematic diagram of a fuel cell system according to a first embodiment of the present invention. The fuel cell system is designed such that a portion of the unreformed fuel can be provided to a fuel cell stack 10 when the fuel cell system is stopped. Deterioration and dehydration of an electrolyte membrane can be prevented. Accordingly, the fuel cell system can generate electrical energy quickly when the fuel cell system is restarted.

The fuel cell stack 10 includes a plurality of unit cells arranged in a stacked configuration with end plates on the outermost sides of the stacked unit cells. A unit cell is the minimum unit for generating electrical energy.

Each unit cell includes a membrane-electrode assembly (MEA) for inducing an electrochemical reaction, and plate-shaped separators disposed on both sides of the membrane-electrode assembly. The first separator faces an anode electrode on a first side of the membrane-electrode assembly and a first channel is formed at the first side. The first separator is referred to as an anode separator. The second separator faces a cathode side of a second side of the membrane-electrode assembly and a second channel is formed at the second side. The second separator is referred to as a cathode separator. Hydrogen gas flows in the first channel of the first separator, and an oxidizing agent such as oxygen or air flows in the second channel of the second separator. Thus, the unit cell can generate electrical energy by an electrochemical reaction between hydrogen and the oxidizing agent.

The fuel cell system further includes a fuel supplier 20 that, in this embodiment, includes a fuel tank for storing a fuel and a pump for supplying the fuel. In this embodiment, the fuel supplier 20 supplies the fuel to a reformer 30 which produces hydrogen to the stack. However, the present invention is not limited thereto. In another embodiment, the fuel supplier includes a pressurized fuel tank which can feed fuel directly to the reformer without the need for a pump. In still another embodiment, the fuel supplier may supply a fuel directly to the stack 10 according to another fuel cell scheme.

The reformer 30 reforms the fuel supplied from the fuel supplier 20 into hydrogen gas and provides the hydrogen gas to the stack 10. The reformer may employ one or more of a partial oxidation reaction, an auto-thermal reforming reaction, or a steam reforming reaction. According to the embodiment of FIG. 1, the reformer 30 employs a steam reforming reaction. The reformer 30 includes a vaporizer 31, a heater 33, and a reforming reactor 34. A water pump 32 feeds water to the vaporizer 31 to generate steam used for the reforming reaction. Air from an air pump 35, and a portion of the fuel from the fuel supplier 20 are fed to the heater 33 where a combustion reaction between the air and fuel provides the heat energy to the reforming reactor 34 to facilitate the reforming reaction. The reforming reactor 34 generates hydrogen gas from the fuel using a steam reforming reaction.

An oxidizing agent supplier 40 supplies an oxidizing agent to the stack 10. According to this embodiment, the oxidizing agent supplier 40 is an air pump that supplies air from the atmosphere to the stack 10.

A first valve 51 is disposed between the fuel supplier 20 and the reformer 30. The first valve 51 selectively allows or blocks the flow of fuel from the fuel supplier 20 to the reformer 30. A stack inlet valve 52 is disposed between the reformer 30 and the stack 10 to selectively allow or block the flow of fuel or hydrogen from the reformer 30 to the stack 10. However, for this embodiment, since the first valve 51 determines whether or not the fuel is supplied to the reformer, the stack inlet valve 52 is optional.

In order to more fully remove any remaining hydrogen from the stack 10, a power dissipation circuit 60 is provided in electrical connection with the stack 10. The remaining hydrogen is permitted to continue to react in the fuel cell stack 10 while the power dissipation circuit 60 draws the resulting residual power generated by such a reaction. In an embodiment, the power dissipation circuit 60 is a resistive circuit that is controlled by an external signal (not shown) that is applied when the electrochemical reaction of the stack 10 is stopped. However, the power dissipation circuit is not so limited, and may comprise any circuit or device for dissipating an electrical power load.

According to an embodiment of the invention, a fuel recycle conduit 70 connects the stack 10 to the vaporizer 31, so that the portion of the unreformed fuel that has been supplied to the fuel cell stack 10 may be recycled back to the reformer 30 when the fuel cell system is restarted.

A controller 80 is connected to the first valve 51, and controls the operation of the first valve 51. The controller 80 opens the first valve 51 during normal operation of the fuel cell system. After the reforming reaction of the reformer 30 and the electrochemical reaction of the stack 10 have been stopped and the reformer has been sufficiently cooled to prevent further reaction of the fuel, the controller 80 opens the first valve 51 for a period of time to supply a portion of the fuel to the reformer 30 and the stack 10.

Figure 2:
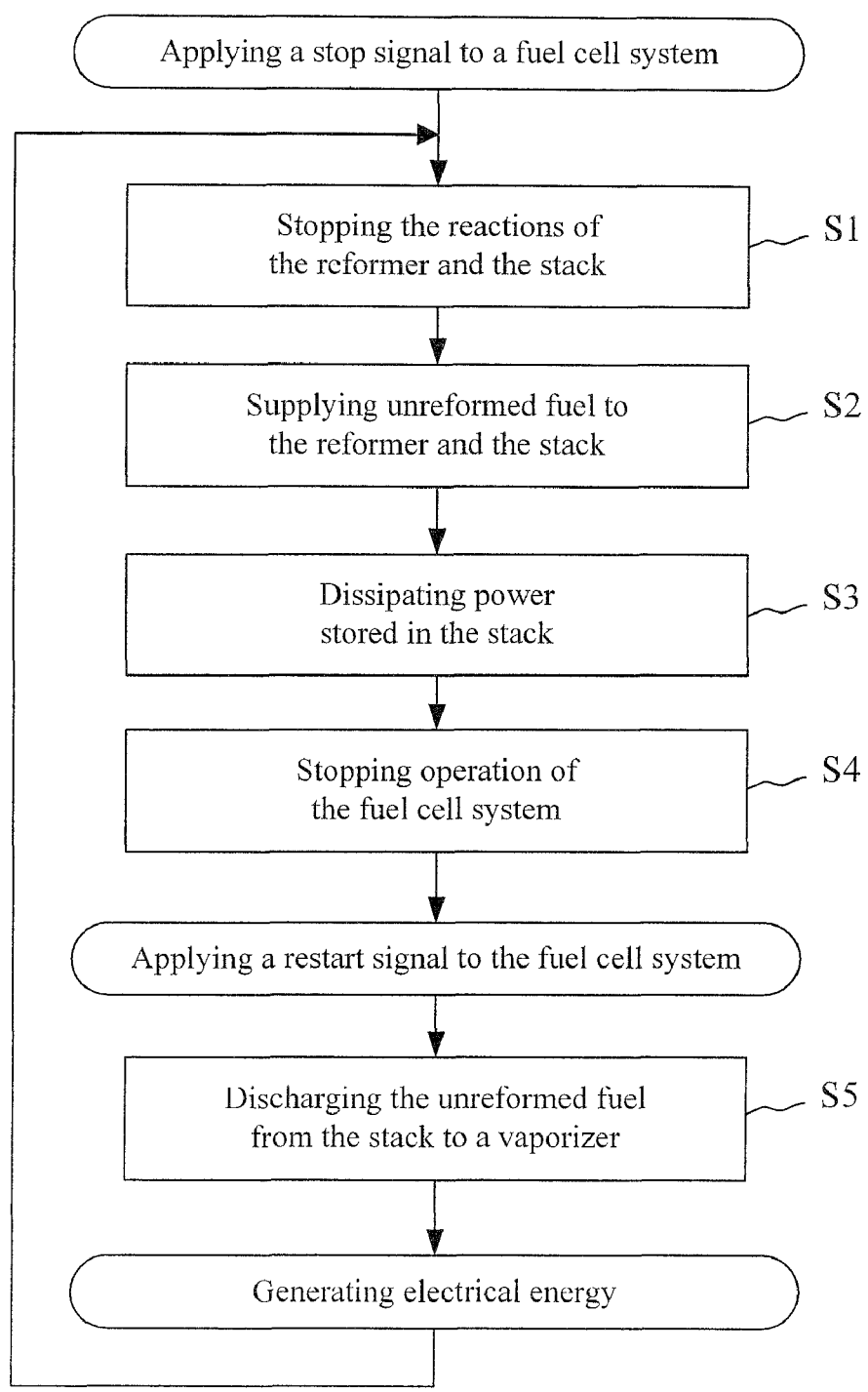
FIG. 2 is a flowchart of a method for operating the fuel cell system shown in FIG. 1.

A method for operation of the fuel cell system will now be described in detail with reference to FIG. 2 which is a flowchart of a method for operating the fuel cell system shown in FIG. 1. The method for operating the fuel cell system according to this embodiment includes a step S1 of stopping the reforming reaction of the reformer 30 and the electrochemical reaction of the stack 10. These reactions are stopped, for example, when an external stop signal is applied to the fuel cell system such as by an operator pushing a shutdown button. According to an embodiment, step S1 is accomplished by stopping the supply of one or both the fuel and air to the heater 33 of the reformer 30. For example, the air supplied to the heater 33 may be stopped for a period of time after the supply of the fuel from the fuel supplier 20 to the reformer 30 is stopped by closing the first valve 51. Since this will stop the heater from generating heat energy, the reforming reactor 34 is cooled as time passes.

Next, a step S2 of supplying a portion of the unreformed fuel to the stack is performed. This may be accomplished by using the controller 80 to open the first valve 51 whereby the unreformed fuel is supplied to and at least partially fills the reformer 30 and the stack 10. According to an embodiment, in order to prevent a side reaction in the reforming reactor 34, the first valve 51 is only opened after the temperature of the reforming reactor 34 is below a predetermined temperature. If ruthenium, alumina, or a combination is used as a catalyst of the reforming reactor 34, the first valve 51 may be opened when the temperature of the reforming reactor 34 is below 200° C. According to this step, a portion of the unreformed fuel is provided in the first channel, and the oxidizing agent is provided in the second channel of the fuel cell stack 10.

Next, a step S3 of dissipating power from the stack 10 is performed. In this step, the amount of power dissipated may be varied according the fuel temperature. For example, the power may be dissipated at 0.2 volts when the fuel is 80° C. The purpose of this step is to electrochemically react the hydrogen gas remaining in the stack 10 after the portion of unreformed fuel has been provided to the stack. By removing virtually all of the remaining hydrogen, deterioration and dehydration of the electrolyte membrane can be reduced. Accordingly, when the fuel cell system is restarted, the fuel cell system is able to generate electrical energy quickly.

According to certain embodiments, the fuel is a gaseous fuel such as methane, propane, butane, or combinations thereof. For such embodiments, upon dissipation of the remaining power from the stack, some of the fuel in the stack may react and convert into higher order hydrocarbons. For example, propane may be converted into hexane, and butane may be converted into octane. The portion of unreformed fuel in the stack along with any higher order hydrocarbons such as hexane or octane protects the electrolyte membrane and prevents deterioration and dehydration.

Next, a step S4 of stopping any remaining operation of the fuel cell system is performed. According to this step, all functions of the fuel cell system can be stopped.

Then, when it is desired to restart the fuel cell, a step S5 of discharging the unreformed fuel in the stack 10 is performed. According to an embodiment, if a restart signal of the fuel cell system is applied, the portion of unreformed fuel in the stack 10 may be recycled to the reformer 30 or to the other elements of the fuel cell system. In one embodiment, the fuel discharged from the stack 10 is recycled to the vaporizer 31 through the recycle conduit 70.

According to the method of this embodiment, when the system is restarted, the performance of the fuel cell system is not impaired, and electrical energy can be generated quickly compared to prior art fuel cell systems.

Figure 3:
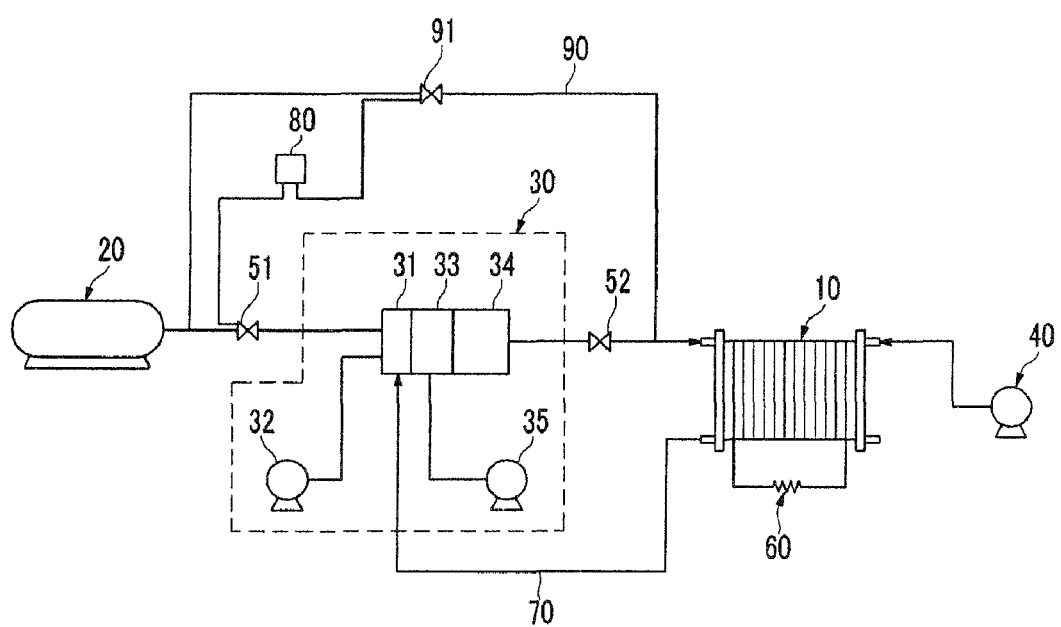
FIG. 3 is a schematic diagram of a fuel cell system according to a variation on the embodiment of FIG. 1.

FIG. 3 is a schematic diagram of a modified fuel cell system of FIG. 1. According to this embodiment, the fuel cell system further includes a bypass conduit 90 which supplies a portion of the fuel from the fuel supplier 20 to the stack 10, bypassing the reformer 30. A portion of the unreformed fuel may be selectively supplied through the bypass conduit 90 from the fuel supplier 20 or blocked from the fuel supplier by a bypass valve 91.

According to this embodiment, the controller 80 controls both the first valve 51 and the bypass valve 91. The controller 80 opens the first valve 51 and closes the bypass valve 91 when the fuel cell system operates under normal conditions. When the reforming reaction of the reformer 30 and the electrochemical reaction of the stack 10 are stopped, the controller 80 opens the bypass valve 91 for a period of time to allow a portion of the unreformed fuel to be supplied directly from the fuel supplier 20 to the stack 10, bypassing the reformer 30. The controller 80 may simultaneously close the first valve 51 in order to stop the flow of fuel into the reformer 30.

According to the illustrated embodiment, a single controller 80 is connected to both the first valve 51 and the bypass valve 91. However, the present invention is not limited thereto. A first controller corresponding to the first valve 51 and a second controller corresponding to the bypass valve 91 may be used.

Figure 4:
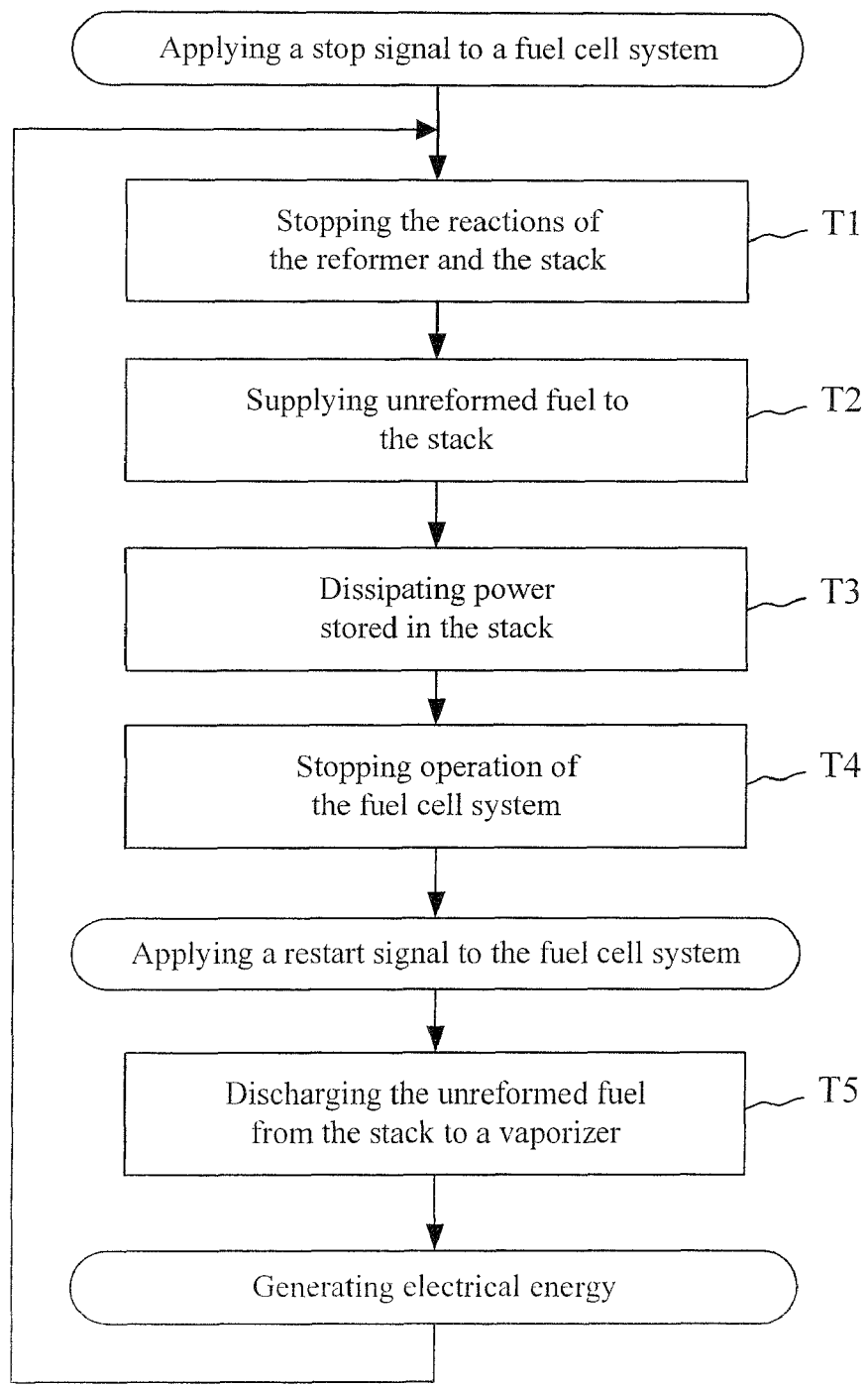
FIG. 4 is a flowchart of a method for operating the fuel cell system shown in FIG. 3.

Turning to FIG. 4, a flowchart is provided to illustrate a method for operating the fuel cell system shown in FIG. 3. The method for operating the fuel cell system according to the illustrated embodiment includes a step T1 of stopping the reforming reaction of the reformer 30 and the electrochemical reaction of the stack 10, for example, by an external stop signal. In one embodiment, the stop signal may be applied by an operator pushing a shutdown button. According to embodiments, one or both of the fuel and air to the heater 33 may be stopped by this step so that the heater 33 stops generating heat energy. In one embodiment, the air supplied to the heater 33 may be stopped for a period of time after the supply of the fuel is blocked. According to one embodiment, when the stop signal is transmitted, the unreformed fuel supplied from the fuel supplier 20 to the reformer 30 is stopped by closing the first valve 51. Thus, the reforming reaction of the reforming reactor 34 is stopped.

Next, a step T2 of supplying the unreformed fuel to the stack is performed. According to this step, the first valve 51 remains closed and the bypass valve 91 is opened by the controller 80, and thus a portion of the unreformed fuel is supplied to and at least partially fills the stack 10. According to this step, the unreformed fuel is supplied to the stack 10 through the bypass conduit 90, and does not pass through the reformer 30. Thus, the unreformed fuel is provided to the first channel of the stack 10, and the oxidizing agent is provided to the second channel of the stack 10.

Next, a step T3 of dissipating power from the stack 10 is performed as described above for the method of FIG. 2. Thus, virtually all of the hydrogen gas remaining in the stack 10 is eliminated by the electrochemical reaction, preventing deterioration and dehydration of the electrolyte membrane. Accordingly, when the fuel cell system is restarted, the fuel cell system generates electrical energy quickly. As previously discussed, suitable fuels are gaseous fuels such as methane, propane, butane, and combinations thereof.

Next, a step T4 may be performed in which any remaining operations of the fuel cell system are stopped. However, in other embodiments, some elements of the fuel system may continue to operate.

Then, when it is desired to restart the fuel cell system, a step T5 is performed in which the portion of unreformed fuel previously supplied to the stack 10 is discharged, for example, after a restart signal has been applied. According to an embodiment, the portion of unreformed fuel may be discharged by recycling it to the vaporizer 31. According to this embodiment, when the system is restarted, the performance of the fuel cell system is not impaired, and electrical energy is generated quickly.

While this invention has been described in connection with what are presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A method for operating a fuel cell system including a fuel supplier for supplying a fuel, a reformer for reforming the fuel into hydrogen gas by a reforming reaction, and a fuel cell stack for generating electrical energy by an electrochemical reaction between the hydrogen gas and an oxidizing agent, the method comprising:
    stopping the reforming reaction of the reformer and the electrochemical reaction of the fuel cell stack;
    supplying a portion of the fuel to the reformer and the fuel cell stack; and
    dissipating power from the fuel cell stack through a resistive element,
    wherein the stopping of the reforming reaction comprises interrupting supply of air to a heater of the reformer.

2. The method of claim 1, wherein the reforming reaction and the electrochemical reaction are stopped by stopping a heat supply to the reformer.

3. The method of claim 2, wherein the portion of the fuel supplied to the reformer and the fuel cell stack is a first portion of the fuel, and the reformer further includes the heater supplied with a second portion of the fuel, and the heat supply to the reformer is further stopped by interrupting flow of the second portion of the fuel supplied to the heater.

4. The method of claim 3, wherein the first portion of the fuel is supplied to the reformer and the fuel cell stack after a temperature of the reformer has cooled to below a predetermined temperature.

5. The method of claim 4, wherein the reformer includes a catalyst comprising an material selected from ruthenium, alumina, and combinations thereof, and the predetermined temperature is less than or equal to 200° C.

6. The method of claim 3, wherein the fuel comprises a gaseous fuel.

7. The method of claim 6, wherein the gaseous fuel comprises a fuel selected from the group consisting of methane, propane, butane, and combinations thereof.

8. The method of claim 6, wherein the power is dissipated at 0.2 volts.

9. The method of claim 8, wherein the power is dissipated when a temperature of the first portion of the fuel is less than about 80° C.

10. The method of claim 3, further comprising discharging the first portion of the fuel from the fuel cell stack upon a restart condition.

11. The method of claim 10, wherein the discharging of the first portion of the fuel comprises recycling the first portion of the fuel to the reformer.

* * * * *

UNITED STATES PATENT AND TRADEMARK OFFICE
CERTIFICATE OF CORRECTION

| | | |
|---|---|---|
| PATENT NO. | : 8,173,310 B2 | Page 1 of 1 |
| APPLICATION NO. | : 12/114999 | |
| DATED | : May 8, 2012 | |
| INVENTOR(S) | : In-Hyuk Son | |

It is certified that error appears in the above-identified patent and that said Letters Patent is hereby corrected as shown below:

In the Claims

Column 8, Claim 5, line 15    Delete "an"
                              Insert -- a --

Signed and Sealed this
Ninth Day of September, 2014

Michelle K. Lee
*Deputy Director of the United States Patent and Trademark Office*